(12) United States Patent
Xu et al.

(10) Patent No.: US 11,996,524 B2
(45) Date of Patent: May 28, 2024

(54) SHELL AND REPAIRING METHOD THEREFOR, RELATED SECONDARY BATTERY, BATTERY MODULE, BATTERY PACK AND POWER CONSUMING DEVICE

(71) Applicant: CONTEMPORARY AMPEREX TECHNOLOGY CO., LIMITED, Ningde (CN)

(72) Inventors: Ye Xu, Ningde (CN); Shunhong Wu, Ningde (CN); Renyu Chen, Ningde (CN); Bin Zhao, Ningde (CN); Zunguang Yan, Ningde (CN); Jiajing Gao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/327,747

(22) Filed: Jun. 1, 2023

(65) Prior Publication Data
US 2023/0307719 A1    Sep. 28, 2023

Related U.S. Application Data

(63) Continuation of application No. PCT/CN2022/073450, filed on Jan. 24, 2022.

(51) Int. Cl.
*H01M 10/00* (2006.01)
*H01M 10/42* (2006.01)
(Continued)

(52) U.S. Cl.
CPC ........... *H01M 10/42* (2013.01); *H01M 50/10* (2021.01); *H01M 50/121* (2021.01);
(Continued)

(58) Field of Classification Search
CPC .. H01M 10/42; H01M 50/121; H01M 50/131; H01M 50/10; H01M 50/103;
(Continued)

(56) References Cited

U.S. PATENT DOCUMENTS

| | | | | |
|---|---|---|---|---|
| 2010/0003583 | A1* | 1/2010 | Seong | H01M 50/186 29/623.2 |
| 2010/0255367 | A1* | 10/2010 | Woo | H01M 50/645 429/181 |
| 2011/0091765 | A1* | 4/2011 | Kim | H01M 50/197 429/185 |

FOREIGN PATENT DOCUMENTS

| | | |
|---|---|---|
| CN | 102185165 A | 9/2011 |
| CN | 106995036 A | 8/2017 |

(Continued)

OTHER PUBLICATIONS

The World Intellectual Property Organization (WIPO) Written Opinion for PCT/CN2022/073450 Oct. 8, 2022 7 pages (including English translation).
(Continued)

*Primary Examiner* — Nicholas P D'Aniello
(74) *Attorney, Agent, or Firm* — ANOVA LAW GROUP, PLLC

(57) ABSTRACT

A shell includes an insulating layer provided at an outer surface of the shell and including a repair part formed of a curable material and having a shape of a mushroom. The repair part includes an upper part having a shape of a cover of the mushroom and a lower part having a shape of a stem of the mushroom. The lower part is embedded in the insulating layer, the upper part protrudes from the insulating layer, and a lower surface of the upper part covers at least a portion of an upper surface of the insulating layer. In a cross section of the repair part perpendicular to a surface of the insulating layer, a longest dimension of the upper part is
(Continued)

greater than or equal to a sum of a width of the lower part and a creepage distance of a battery.

20 Claims, 2 Drawing Sheets

(51) Int. Cl.
  *H01M 50/10* (2021.01)
  *H01M 50/121* (2021.01)
  *H01M 50/124* (2021.01)
  *H01M 50/131* (2021.01)
  *H01M 50/14* (2021.01)
  *H01M 50/209* (2021.01)

(52) U.S. Cl.
  CPC ....... *H01M 50/124* (2021.01); *H01M 50/131* (2021.01); *H01M 50/14* (2021.01); *H01M 50/209* (2021.01); *H01M 2220/20* (2013.01)

(58) Field of Classification Search
  CPC .. H01M 10/052; H01M 50/124; H01M 50/14; H01M 50/209; H01M 2220/20; H01M 2300/0065; Y02E 60/10
  See application file for complete search history.

(56) References Cited

FOREIGN PATENT DOCUMENTS

| | | |
|---|---|---|
| CN | 110601098 A | 12/2019 |
| CN | 110790868 A | 2/2020 |
| CN | 112769075 A | 5/2021 |
| JP | 2007265967 A | 10/2007 |
| JP | 2013084751 A | 5/2013 |
| WO | 2013051433 A1 | 4/2013 |

OTHER PUBLICATIONS

The World Intellectual Property Organization (WIPO) International Search Report for PCT/CN2022/073450 Oct. 8, 2022 6 pages (including English translation).
The Japan Patent Office (JPO) Notification of Reasons for Refusal for Application No. 2023-535554 Jan. 15, 2024 11 Pages(including translation).
Korean Intellectual Property Office (KIPO) Office Action 1 for Application No. 10-2023-7018701 Dec. 20, 2023 6 Pages (including translation).

* cited by examiner

SHELL AND REPAIRING METHOD THEREFOR, RELATED SECONDARY BATTERY, BATTERY MODULE, BATTERY PACK AND POWER CONSUMING DEVICE

CROSS-REFERENCE TO RELATED APPLICATION

This application is a continuation of International Application No. PCT/CN2022/073450, filed on Jan. 24, 2022, the entire content of which is incorporated herein by reference.

TECHNICAL FIELD

The present application relates to the technical field of lithium batteries, and in particular to a shell and a repairing method therefor, a secondary battery, a battery module, a battery pack and a power consuming device.

BACKGROUND ART

In recent years, with the increasing application range of lithium-ion batteries, lithium-ion batteries are widely used in energy storage power systems such as hydroelectric, thermal, wind and solar power stations, as well as electric tools, electric bicycles, electric motorcycles, electric vehicles, military equipment, aerospace and other fields. At present, after battery modules or battery packs mainly composed of aluminum shell cells are assembled into groups and welded with connecting pieces, if insulating layers (such as insulation film, insulation paint or other coatings or claddings) on the outer surface of the cells are damaged or scratched at this time, the whole battery units (or modules) or battery packs will be scrapped due to insulation and withstand voltage issues (Contemporary Amperex Technology Co., Limited alone had a scrap rate of 0.2% in 2020, and the loss cost was more than RMB 100 million).

After production, the integral structure of the battery or battery pack is non-detachable. If the insulating layer is damaged at this time, it is impossible to entirely remove the insulating layer before repair. A conventional repair method generally involves using a pressure-sensitive adhesive tape to patch the defective area; however, the pressure-sensitive adhesive tape has a low modulus (<2 MPa), wrinkling or displacement may occur in the original patched position due to creep after many vibration impacts, and consequently, the safety and service life of the battery cannot be guaranteed.

SUMMARY OF THE DISCLOSURE

The present application is made in view of the above-mentioned issues, and an object thereof is to provide a shell for a secondary battery, the shell comprising an insulating layer having a repair part with a mushroom-shaped structure, whereby not only no wrinkling and displacement occur during vibration impacts, but also the insulation and withstand voltage performance of the repaired shell is guaranteed; furthermore, it can be effectively ensured that the creepage distance can meet the original technical requirements of the battery without causing battery or battery pack scrappage.

In order to achieve the above object, the present application provides a shell, wherein an outer surface of the shell has an insulating layer, and the insulating layer has a repair part, wherein the repair part is a mushroom-shaped structure formed of a curable material and comprising an upper mushroom cover and a lower mushroom stem, the mushroom stem is embedded in the insulating layer, the mushroom cover protrudes from the insulating layer, and a lower surface of the mushroom cover covers an upper surface of the insulating layer, wherein in any cross section of the repair part perpendicular to the surface of the insulating layer, the longest dimension of the mushroom cover is more than or equal to the width w of the mushroom stem+the creepage distance L of the battery.

In the present application, by forming the repair part with a mushroom-shaped structure on the shell, not only no wrinkling and displacement occur during vibration impacts, but also the insulation and withstand voltage performance of the repaired shell is guaranteed; in addition, in any cross section of the repair part perpendicular to the surface of the insulating layer, the longest dimension of the mushroom cover is more than or equal to the width w of the mushroom stem+the creepage distance L of the battery, which can effectively ensure that the creepage distance can meet the original technical requirements of the battery without causing battery or battery pack scrappage.

In some embodiments, in any cross section of the repair part perpendicular to the surface of the insulating layer, the largest thickness of the mushroom cover is more than or equal to ½ the thickness t of the insulating layer. Therefore, the insulation and withstand voltage performance of the shell can be guaranteed.

In some embodiments, the depth at which the mushroom stem is embedded in the insulating layer is less than or equal to ½ the thickness t of the insulating layer. Therefore, the integrity of the original insulating layer is guaranteed to the maximum extent, thus ensuring the insulation and withstand voltage performance of the shell.

In some embodiments, the wetting angle $\theta$ of the curable material on the surface of the insulating layer satisfies $1° < \theta < 90°$, and in any cross section of the repair part perpendicular to the surface of the insulating layer, the width w of the mushroom stem is more than or equal to $10 t \times \cot \theta + 3$ where t is the thickness of the insulating layer, in millimeters. Therefore, the curable material sufficiently infiltrates the insulating layer, thus ensuring the insulation and withstand voltage performance of the shell.

In some embodiments, the curable material comprises a photocurable material or a heat-curable material. Therefore, the adhesion between the repair part and the original insulating layer is guaranteed, thus ensuring the insulation and withstand voltage performance of the shell.

In some embodiments, the viscosity of the photocurable material or the heat-curable material is 30-500 mPa·s. Therefore, the adhesion between the repair part and the original insulating layer is guaranteed, thus ensuring the insulation and withstand voltage performance of the shell.

In some embodiments, the photocurable material is an ultraviolet (UV) photocurable material, and the ultraviolet photocurable material comprises:

30-60 wt. % of a matrix resin,
30-50 wt. % of a diluting monomer,
3-15 wt. % of a photoinitiator, and
0-20 wt. % of additional auxiliaries; and
the above contents are based on the total weight of the photocurable material, and the sum of the contents of these components is 100 wt. %. Therefore, the adhesion between the repair part and the original insulating layer is guaranteed, thus ensuring the insulation and withstand voltage performance of the shell.

In some embodiments, the heat-curable material comprises
45-70 wt. % of a matrix resin,
0.1-5 wt. % of a catalyst, and
29.9-50 wt. % of auxiliaries; and
the above contents are based on the total weight of the heat-curable material, and the sum of the contents of these components is 100 wt. %. Therefore, the adhesion between the repair part and the original insulating layer is guaranteed, thus ensuring the insulation and withstand voltage performance of the shell.

In any embodiment, the diluting monomer is selected from 1,6-hexanediol diacrylate, isobornyl acrylate or isobornyl methacrylate, in some embodiments from 1,6-hexanediol diacrylate and isobornyl acrylate; and the photoinitiator is at least one selected from 2-hydroxy-2-methyl-1-phenyl-acetone, 1-hydroxycyclohexylphenyl ketone, phenylbis(2,4,6-trimethylbenzoyl)phosphine oxide and 2,4,6-trimethyl-benzoyl-diphenylphosphine oxide. Therefore, the adhesion between the repair part and the original insulating layer is guaranteed, thus ensuring the insulation and withstand voltage performance of the shell.

A second aspect of the present application further provides a method for repairing a shell, the comprising the following steps:
a) positioning of a defect: positioning a defective area on the outer surface of the shell and identifying the boundary of the defective area;
b) removal of an insulating layer: removing part of the insulating layer in the defective area to form a groove covering the entire defective area;
c) formation of a mushroom stem: repairing the groove with a curable material to form the mushroom stem, and then performing pre-curing; and
d) formation of a mushroom cover: repairing a surface layer with the curable material and then performing final curing to form the mushroom cover, and curing the mushroom cover and the mushroom stem together to form a mushroom-shaped structure;
wherein an outer surface of the shell formed by the above steps a)-d) has an insulating layer, and the insulating layer has a repair part, wherein
the repair part is a mushroom-shaped structure formed of a curable material and comprising an upper mushroom cover and a lower mushroom stem, the mushroom stem is embedded in the insulating layer, the mushroom cover protrudes from the insulating layer, and a lower surface of the mushroom cover covers an upper surface of the insulating layer, in any cross section of the repair part perpendicular to the surface of the insulating layer, the longest dimension of the mushroom cover is more than or equal to the width w of the mushroom stem+the creepage distance L of the battery. Therefore, through two repairs, a mushroom-shaped repair part is formed, thus ensuring the insulation and withstand voltage performance of the shell.

A third aspect of the present application provides a secondary battery, comprising the shell of the first aspect of the present application or the shell repaired by the method of the second aspect of the present application, wherein the inside of the shell comprises an electrode assembly and an electrolyte solution; alternatively, the inside of the shell comprises an electrode assembly and a solid/semi-solid electrolyte.

A fourth aspect of the present application provides a battery module, comprising the secondary battery of the third aspect of the present application.

A fifth aspect of the present application provides a battery pack, comprising the battery module of the fourth aspect of the present application.

A sixth aspect of the present application provides a power consuming device, comprising at least one selected from the secondary battery of the third aspect of the present application, the battery module of the fourth aspect of the present application, or the battery pack of the fifth aspect of the present application.

In the present application, by forming the repair part with a mushroom-shaped structure having a specific size on the shell, not only no wrinkling and displacement occur during vibration impacts, but also the insulation and withstand voltage performance of the repaired shell is guaranteed; furthermore, it is effectively ensured that the creepage distance can meet the original technical requirements of the battery without causing battery or battery pack scrappage.

LIST OF REFERENCE SIGNS

Figure 1:
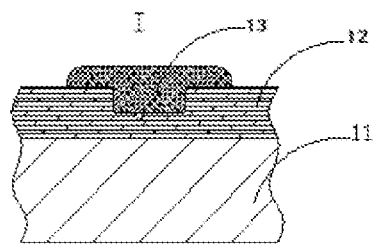
FIG. 1 is a structural schematic diagram of a repair part of a shell, wherein I represents a defective area, 11 represents the shell, 12 represents an insulating layer, and 13 represents the repair part.

1 battery pack; 2 upper box body; 3 lower box body; 4 battery module; 5 secondary battery; 51 housing; 52 electrode assembly; and 53 top cover assembly.

DETAILED DESCRIPTION OF EMBODIMENTS

Hereinafter, embodiments of the shell and repairing method therefor, secondary battery, battery module, battery pack and power consuming device of the present application are disclosed in detail with reference to the detailed description of the drawings as appropriate. However, unnecessary detailed illustrations may be omitted in some instances. For example, there are situations where detailed description of well known items and repeated description of actually the same structure are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if the minimum range values 1 and 2 are listed, and the maximum range values 3, 4, and 5 are listed, the following ranges are all contemplated: 1-3, 1-4, 1-5, 2-3, 2-4 and 2-5. In the present application, unless stated otherwise, the numerical range "a to b" denotes an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, etc.

All the embodiments and optional embodiments of the present application can be combined with one another to form new technical solutions, unless otherwise stated.

All the technical features and optional technical features of the present application can be combined with one another to form a new technical solution, unless otherwise stated.

Unless otherwise stated, all the steps of the present application can be performed sequentially or randomly, in some embodiments sequentially. For example, the method comprising steps (a) and (b) indicates that the method may comprise steps (a) and (b) performed sequentially, and may further include steps (b) and (a) performed sequentially. For example, reference to "the method may further comprise step (c)" indicates that step (c) may be added to the method in any order, e.g., the method may comprise steps (a), (b) and (c), steps (a), (c) and (b), or also steps (c), (a) and (b), etc.

The terms "comprise" and "include" mentioned in the present application are open-ended, unless otherwise stated. For example, the terms "comprising" and "including" may mean that other components not listed may also be comprised or included.

In the present application, the term "or" is inclusive unless otherwise specified. For example, the phrase "A or B" means "A, B, or both A and B." More specifically, the condition "A or B" is satisfied by any one of the following: A is true (or present) and B is false (or not present); A is false (or not present) and B is true (or present); or both A and B are true (or present). In this disclosure, the phrases "at least one of A, B, and C" and "at least one of A, B, or C" both mean only A, only B, only C, or any combination of A, B, and C.

At present, after battery modules or battery packs mainly composed of aluminum shell cells are assembled into groups and welded with connecting pieces, if insulating layers (such as insulation film, insulation paint or other coatings or claddings) on the outer surface of the cells are damaged or scratched at this time, the whole battery units (or modules) or battery packs will be scrapped due to insulation and withstand voltage issues (Contemporary Amperex Technology Co., Limited alone had a scrap rate of 0.2% in 2020, and the loss cost was more than RMB 100 million).

After production, the integral structure of the battery or battery pack is non-detachable. If the insulating layer is damaged at this time, it is impossible to entirely remove the insulating layer before repair. A conventional repair method generally involves using a pressure-sensitive adhesive tape to patch the defective area; however, the pressure-sensitive adhesive tape has a low modulus (<2 MPa), wrinkling or displacement may occur in the original patched position due to creep after many vibration impacts, and consequently, the safety and service life of the battery cannot be guaranteed. After extensive research, the inventors have found that the shell of the first aspect of the present application can ensure the safety of the battery by means of the repair part containing the mushroom-shaped structure with a specific size.

Shell

In one embodiment of the application, the present application provides a shell, wherein an outer surface of the shell has an insulating layer, and the insulating layer has a repair part, wherein the repair part is a mushroom-shaped structure formed of a curable material and comprising an upper mushroom cover and a lower mushroom stem, the mushroom stem is embedded in the insulating layer, the mushroom cover protrudes from the insulating layer, and a lower surface of the mushroom cover covers an upper surface of the insulating layer, wherein in any cross section of the repair part perpendicular to the surface of the insulating layer, the longest dimension of the mushroom cover is more than or equal to the width w of the mushroom stem+the creepage distance L of the battery.

Although the mechanism is yet unclear, the applicant has unexpectedly discovered that In the present application, by forming the repair part with a mushroom-shaped structure on the shell, not only no wrinkling and displacement occur during vibration impacts, but also the insulation and withstand voltage performance of the repaired shell is guaranteed; in addition, in any cross section of the repair part perpendicular to the surface of the insulating layer, the longest dimension of the mushroom cover is more than or equal to the width w of the mushroom stem+the creepage distance L of the battery, which can effectively ensure that the creepage distance can meet the original technical requirements of the battery without causing battery or battery pack scrappage.

In some embodiments, the shell is used in a secondary battery.

In some embodiments, when the top view of the mushroom cover is a regular circle, the longest dimension of the mushroom cover in any cross section of the repair part perpendicular to the surface of the insulating layer is the diameter of the circle, also referred to as the diameter of the mushroom cover.

In some embodiments, the creepage distance L of the battery is the shortest path between two conductive parts or between the conductive part and an equipment protection interface, as measured along the insulation surface. Under different application conditions, since the insulating material around a conductor is electrically polarized, the insulating material is charged. The creepage distance specification of a power battery is usually obtained by look up tables by reference to the national standard GB/T 16935.1-2008 Insulation Coordination of Equipment with Low-voltage Systems—Part 1: Principles, Requirements and Tests. According to the effective voltage of 800 V, material group I and pollution grade 3, the corresponding creepage distance requirement is ≥10 mm, and therefore, the designed creepage distance of the current power battery pack is ≥10 mm. The examples of the present disclosure are also designed according to this requirement.

In some embodiments, in any cross section of the repair part perpendicular to the surface of the insulating layer, the largest thickness of the mushroom cover is more than or equal to ½ the thickness t of the insulating layer. Therefore, the insulation and withstand voltage performance of the shell can be guaranteed.

In some embodiments, the depth at which the mushroom stem is embedded in the insulating layer is less than or equal to ½ the thickness t of the insulating layer. Therefore, the integrity of the original insulating layer is guaranteed to the maximum extent, thus ensuring the insulation and withstand voltage performance of the shell.

In some embodiments, the wetting angle θ of the curable material on the surface of the insulating layer satisfies 1°<θ<90°, and in any cross section of the repair part perpendicular to the surface of the insulating layer, the width w of the mushroom stem is more than or equal to 10t×cot θ+3 where t is the thickness of the insulating layer, in millimeters. Therefore, the curable material sufficiently infiltrates the insulating layer, thus ensuring the insulation and withstand voltage performance of the shell.

The wetting angle of the curable material on the surface of the insulating layer refers to the included angle between the interface of the liquid curable material and the insulating layer and the tangent of the surface of the curable material at the contact point between the curable material and the insulating layer.

In any cross section of the repair part perpendicular to the surface of the insulating layer, the width of the mushroom stem refers to the largest width in the horizontal distance in the cross section of the mushroom stem. In some embodiments, when the horizontal cross section of the mushroom stem is a regular circle, the width of the mushroom stem refers to the diameter of the circle, also referred to as the diameter of the mushroom stem.

In some embodiments, the curable material comprises a photocurable material or a heat-curable material. Therefore, the adhesion between the repair part and the original insulating layer is guaranteed, thus ensuring the insulation and withstand voltage performance of the shell.

In some embodiments, the viscosity of the photocurable material or the heat-curable material is 30-500 mPa·s. Therefore, the adhesion between the repair part and the original insulating layer is guaranteed, thus ensuring the insulation and withstand voltage performance of the shell.

In some embodiments, the photocurable material is an ultraviolet (UV) photocurable material, and the ultraviolet photocurable material comprises:

30-60 wt. % of a matrix resin,
30-50 wt. % of a diluting monomer,
3-15 wt. % of a photoinitiator, and
0-20 wt. % of additional auxiliaries; and
the above contents are based on the total weight of the photocurable material, and the sum of the contents of these components is 100 wt. %. Therefore, the adhesion between the repair part and the original insulating layer is guaranteed, thus ensuring the insulation and withstand voltage performance of the shell.

In some embodiments, the heat-curable material comprises
45-70 wt. % of a matrix resin,
0.1-5 wt. % of a catalyst, and
29.9-50 wt. % of additional auxiliaries; and
the above contents are based on the total weight of the heat-curable material, and the sum of the contents of these components is 100 wt. %. Therefore, the adhesion between the repair part and the original insulating layer is guaranteed, thus ensuring the insulation and withstand voltage performance of the shell.

In some embodiments, the matrix resins in the UV-curable material and in the heat-curable material are the same or different, and can be each independently selected from acrylate resins, methacrylate resins (such as ethyl methacrylate and hydroxyethyl methacrylate) or epoxy acrylate resins, in some embodiments acrylate resins and epoxy acrylate resins.

In some embodiments, the diluting monomer in the UV-curable material is selected from 1,6-hexanediol diacrylate, isobornyl acrylate or isobornyl methacrylate, in some embodiments from 1,6-hexanediol diacrylate and isobornyl acrylate.

In some embodiments, the photoinitiator is at least one selected from 2-hydroxy-2-methyl-1-phenyl-acetone, 1-hydroxycyclohexylphenyl ketone, phenylbis(2,4,6-trimethylbenzoyl)phosphine oxide and 2,4,6-trimethylbenzoyl-diphenylphosphine oxide. Therefore, the adhesion between the repair part and the original insulating layer is guaranteed, thus ensuring the insulation and withstand voltage performance of the shell.

In some embodiments, the catalyst is selected from dicumyl peroxide, cumyl hydroperoxide, dicumyl hydroperoxide, dibenzoyl peroxide, dibenzoyl superoxide, tert-butyl hydroperoxide, tert-butyl benzoate peroxide, tert-butyl isopropyl carbonate peroxide, tert-butyl peroxide or di-tert-butyl peroxide. These catalysts can be used alone or in combination. In some embodiments, cumyl hydroperoxide is used.

In some embodiments, the additional auxiliaries in the UV-curable material and in the thermal curing material are the same or different, and can each independently include a light stabilizer, a heat stabilizer, a plasticizer, a filler, a pigment dispersant, a leveling agent, a defoamer, etc.

The light stabilizer can be a hindered amine, such as bis-1-octyloxy-2,2,6,6-tetramethylpiperidinol sebacate, CHISORB292, and CHISORB770; benzophenone or benzotriazole.

The heat stabilizer is dibutyltin dilaurate or fatty acid zinc.

The plasticizer is at least one of dioctyl phthalate, diodecyl phthalate, diisononyl phthalate, diisodecyl phthalate, dioctyl adipate, dioctyl sebacate, dioctyl azelate, triphenyl phosphate, diphenyl isooctyl phosphate and alkyl sulfonate plasticizers.

The filler is at least one of light calcium carbonate, calcium carbonate modified with fatty acid or fatty acid salt, calcined kaolin, fumed silica, PVC powder, talcum powder, organic montmorillonite, diatomite, titanium dioxide, hollow spheres, carbon black, barium sulfate and titanium dioxide.

The leveling agent includes, but is not limited to, one of or a mixture of some of polyacrylates or silicone resins or fluorocarbon surfactants, fluorine-modified acrylates or combinations thereof, such as BYK333, BYK360, Glide 432, Flow 300, and Efka 3600 from BYK-Chemie GmbH, Germany, 1154 from Moneng Huagong Youxian Gongsi, etc.

The defoamer includes, but is not limited to, one or more of organic polymers or silicone resins or combinations thereof, such as polydimethylsiloxane, Deqian 2700, Elementis DF7015, BYK-141, etc.

The pigment dispersant includes, but is not limited to, one of or a combination of some of synthetic polymers such as long-chain fatty acids and polyamino salts, polymers containing pigment affinity groups such as multivalent carboxylates, silicon- and titanium-based coupling agents, etc., e.g.

one or more of BYK163, BYK164 and BYK358N from BYK-Chemie GmbH, Germany, and Disuper S28 from Corechem.

The UV-curable material can be instantly dried or very quickly cured, which is beneficial to quick repair and has strict requirements on curing time. The heat-curable material has a slower curing time than the UV-curable material but has a good leveling effect; furthermore, the material has a good wetting effect for the insulating layer during thermal curing, and the quality of the obtained repair part is high.

In some embodiments, the present application further provides a method for repairing a shell, the comprising the following steps:
- a) positioning of a defect: positioning a defective area on the outer surface of the shell and identifying the boundary of the defective area;
- b) removal of an insulating layer: removing part of the insulating layer in the defective area to form a groove covering the entire defective area;
- c) formation of a mushroom stem: repairing the groove with a curable material to form the mushroom stem, and then performing pre-curing; and
- d) formation of a mushroom cover: repairing a surface layer with the curable material and then performing final curing to form the mushroom cover, and curing the mushroom cover and the mushroom stem together to form a mushroom-shaped structure;

wherein an outer surface of the shell formed by the above steps a)-d) has an insulating layer, and the insulating layer has a repair part, wherein
the repair part is a mushroom-shaped structure formed of a curable material and comprising an upper mushroom cover and a lower mushroom stem, the mushroom stem is embedded in the insulating layer, the mushroom cover protrudes from the insulating layer, and a lower surface of the mushroom cover covers an upper surface of the insulating layer, in any cross section of the repair part perpendicular to the surface of the insulating layer, the longest dimension of the mushroom cover is more than or equal to the width w of the mushroom stem+the creepage distance L of the battery. Therefore, through two repairs, a mushroom-shaped repair part is formed, thus ensuring the insulation and withstand voltage performance of the shell.

In some embodiments, in step a), the defective area is positioned by means of a battery management system (BMS). In the BMS, once the defective area appears, the temperature or voltage becomes abnormal, that is, the feedback voltage becomes 0 V or another low voltage value, or the temperature collected by a thermosensitive resistor (NTC) obviously increases.

The boundary of the defective area is identified by means of a scanning electron microscope or a vision camera (CCD).

In some embodiments, in step b), the projected area of the groove in the horizontal direction is greater than the projected area of the defective area in the horizontal direction. Therefore, it is ensured that the defective area is completely repaired, and the insulation and withstand voltage performance of the shell is guaranteed.

In some embodiments, in step b), the depth of the groove is approximately equal to the depth of the mushroom stem, and the width of the groove is approximately equal to the width w of the mushroom stem. In addition, it needs to be noted that in general, the width w of the mushroom stem should be greater than or equal to the width of the defective area; and when the width of the defective area is relatively small, or even less than 3 mm, the width w of the mushroom stem should also satisfy $w \geq 10t \times \cot \theta + 3$, where t is the thickness of the insulating layer, in mm, and $\theta$ is the wetting angle of the curable material on the surface of the insulating layer.

In some embodiments, in step b), part of the insulating layer is removed by means of laser cleaning or mechanical grinding. The laser cleaning is carried out by making the nonmetallic coating absorb laser energy by means of a pulsed fiber laser or a carbon dioxide laser, and removing part of the coating by means of thermal scorching and thermal expansion. The mechanical grinding removes a certain thickness of coating by means of milling or grinding.

In some embodiments, in step c), in step c), the repaired thickness of the curable material is the depth of the mushroom stem to (the depth of the mushroom stem+10% of the thickness t of the insulating layer) to form the mushroom stem. Therefore, it is ensured that the curable material fully infiltrates the groove to form the mushroom stem, thus ensuring the insulation and withstand voltage performance of the shell.

In some embodiments, the energy required for the pre-curing in step c) and the energy required for the final curing in step d) are the same or different. When the curable material is a photocurable material, the irradiation energy is 2000-4000 mJ/cm^2. The UV irradiation energy is directly proportional to the thickness, and the total energy is $$E=E0*t,$$

t is the thickness of a single layer coating, in cm; and
E0 is the required energy per unit thickness, in mJ/cm$^3$.

Where the curable material is a heat-curable material, the heating temperatures of the pre-curing in step c) and the final curing in step d) are each independently: 60-80° C., in some embodiments 70-80° C., for pre-curing, wherein selecting a higher temperature within the safe temperature range can shorten the pre-curing time, and an excessively high temperature may cause an irreversible damage to the cell; and 35-60° C., in some embodiments 40-50° C., for final curing.

In some embodiments, the curable material is as described hereinabove.

In some embodiments, before step c), the surface of the groove is cleaned by means of plasma. Therefore, the surface tension of the insulating layer can be increased, the surface polarity of the insulating layer can be enhanced, and the adhesion between the repair part and the insulating layer can be improved.

Therefore, in some embodiments, the method of the present application comprises the following steps:
- a) positioning of a defect: positioning a defective area on the outer surface of the shell and identifying the boundary of the defective area;
- b) removal of an insulating layer: removing part of the insulating layer in the defective area to form a groove covering the entire defective area;
- c0) plasma cleaning of the groove surface;
- c) formation of a mushroom stem: repairing the groove with a curable material to form the mushroom stem, and then performing pre-curing; and
- d) formation of a mushroom cover: repairing a surface layer with the curable material and then performing final curing to form the mushroom cover, and curing the mushroom cover and the mushroom stem together to form a mushroom-shaped structure.

In some embodiments, in steps c) and d), the repair is carried out by means of an ink-jet printing process and a precision dispensing process. The ink-jet printing process involves the use of a curable material to precisely print a repair part with a certain thickness in a designated area by means of an ink-jet printer. The precision dispensing process involves the use of a precision micro-metering dispensing apparatus to dot-coat a curable material in a designated area to form a repair part with a certain thickness.

In some embodiments, the present application further provides a secondary battery, comprising the above-mentioned shell or the shell repaired by the above-mentioned method, wherein the inside of the shell comprises an electrode assembly and an electrolyte solution; alternatively, the inside of the shell comprises an electrode assembly and a solid/semi-solid electrolyte.

The insulation performance of the secondary battery is characterized by the insulation impedance (in GΩ) thereof as measured at 500 V direct current (DC). The insulation impedance of the secondary battery is ≥10 GΩ.

The withstand voltage performance of the secondary battery is characterized by the leakage current (in mA) thereof as measured at 2700 V direct current (DC). The leakage current of the secondary battery is ≤0.1 mA.

Typically, the secondary battery comprises a positive electrode piece, a negative electrode piece, an electrolyte and a separator. During the charge and discharge of the battery, active ions are intercalated and de-intercalated back and forth between a positive electrode piece and a negative electrode piece. The electrolyte plays the role of conducting ions between the positive electrode piece and the negative electrode piece. The separator is provided between the positive electrode piece and the negative electrode piece, and mainly functions to prevent the positive and negative electrodes from short-circuiting and enables ions to pass through.

[Positive Electrode Piece]

The positive electrode piece comprises a positive electrode current collector and a positive electrode film layer provided on at least one surface of the positive electrode current collector, the positive electrode film layer comprising the positive electrode active material of the first aspect of the present application.

By way of example, the positive electrode current collector has two surfaces opposite in its own thickness direction, and the positive electrode film layer is provided on either or both of the opposite surfaces of the positive electrode current collector.

In some embodiments, the positive electrode current collector can be a metal foil or a composite current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In some embodiments, the positive active material may be a positive active material known in the art for batteries. By way of example, the positive electrode active material may include at least one of the following materials: lithium-containing phosphates of an olivine structure, lithium transition metal oxides and their respective modified compounds. However, the present application is not limited to these materials, and other conventional materials that can be used as positive electrode active materials for batteries may also be used. These positive electrode active materials may be used alone or in combination of two or more. Herein, examples of lithium transition metal oxides may include, but are not limited to, at least one of lithium cobalt oxide (e.g. $LiCoO_2$), lithium nickel oxide (e.g. $LiNiO_2$), lithium manganese oxide (e.g. $LiMnO_2$, $LiMn_2O_4$), lithium nickel cobalt oxide, lithium manganese cobalt oxide, lithium nickel manganese oxide, lithium nickel cobalt manganese oxide (e.g. $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$)), lithium nickel cobalt aluminum oxide (e.g. $LiNi_{0.85}Co_{0.15}Al_{0.5}O_2$), and modified compounds thereof, and the like. Examples of lithium-containing phosphates of olivine structure may include, but are not limited to, at least one of lithium iron phosphate (e.g. $LiFePO_4$ (also referred to as LFP)), lithium iron phosphate and carbon composites, lithium manganese phosphate (e.g. $LiMnPO_4$), lithium manganese phosphate and carbon composites, lithium iron manganese phosphate, and lithium iron manganese phosphate and carbon composites.

In some embodiments, the positive electrode film layer optionally further comprises a binder. By way of example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode film layer optionally further comprises a conductive agent. By way of example, the conductive agent may include at least one of superconducting carbon, acetylene black, carbon black, Ketjen black, carbon dots, carbon nanotubes, graphene, and carbon nanofibers.

In some embodiments, the positive electrode piece can be prepared as follows:

dispersing the above-mentioned components for preparing the positive electrode piece, such as a positive active material, a conductive agent, a binder and any other components, in a solvent (e.g., N-methylpyrrolidone) to form a positive slurry; and coating the positive electrode current collector with the positive electrode slurry, followed by the procedures such as drying and cold pressing, so as to obtain the positive electrode piece.

[Negative Electrode Piece]

The negative electrode piece comprises a negative electrode current collector and a negative electrode film layer provided on at least one surface of the negative electrode current collector, the negative electrode film layer comprising a negative electrode active material.

By way of example, the negative electrode current collector has two surfaces opposite in its own thickness direction, and the negative electrode film layer is provided on either or both of the two opposite surfaces of the negative electrode current collector.

In some embodiments, the negative electrode current collector can be a metal foil or a composite current collector. For example, as a metal foil, a copper foil can be used. The composite current collector may comprise a polymer material substrate and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material can be a negative electrode active material known in the art for batteries. By way of example, the negative electrode active material may include at least one of the following materials: artificial graphite, natural graphite, soft carbon, hard carbon, a silicon-based material, a tin-based material and lithium titanate, etc. The silicon-based material may be at least one selected from elemental silicon, silicon oxides, silicon carbon composites, silicon nitrogen composites and silicon alloys. The tin-based material may be at least one selected from elemental tin, tin oxides, and tin alloys. However, the present application is not limited to these materials, and other conventional materials that can be used as negative electrode active materials for batteries can also be used. These negative electrode active materials may be used alone or in combination of two or more.

In some embodiments, the negative electrode film layer optionally further comprises a binder. The binder may be at least one selected from a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer optionally further comprises a conductive agent. The conductive agent may be at least one selected from superconductive carbon, acetylene black, carbon black, ketjenblack, carbon dots, carbon nanotubes, graphene, and carbon nanofibers.

In some embodiments, the negative electrode film layer optionally further comprises other auxiliary agents, such as thickener (e.g. sodium carboxymethyl cellulose (CMC-Na)) and the like.

In some embodiments, the negative electrode piece can be prepared as follows: dispersing the above-mentioned components for preparing the negative electrode piece, such as negative electrode active material, conductive agent, binder and any other components, in a solvent (e.g. deionized water) to form a negative electrode slurry; and coating a negative electrode current collector with the negative electrode slurry, followed by procedures such as drying and cold pressing, so as to obtain the negative electrode piece.

[Electrolyte]

The electrolyte plays the role of conducting ions between the positive electrode piece and the negative electrode piece. The type of the electrolyte is not specifically limited in the present application, and can be selected according to actual requirements. For example, the electrolyte may be in a liquid state, a gel state or an all-solid state.

In some implementations, the electrolyte is an electrolyte solution. The electrolyte solution includes an electrolyte salt and a solvent.

In some embodiments, the electrolyte salt may be at least one selected from lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution optionally further comprises an additive. For example, the additive may include a negative electrode film-forming additive and a positive electrode film-forming additive, and may further include an additive that can improve certain performances of the battery, such as an additive that improves the overcharge performance of the battery, or an additive that improves the high temperature or low-temperature performance of the battery.

[Separator]

In some embodiments, the secondary battery further comprises a separator. The type of the separator is not particularly limited in the present application, and any well known porous-structure separator with good chemical stability and mechanical stability may be selected.

In some embodiments, the material of the separator may be at least one selected from glass fibers, non-woven fabrics, polyethylene, polypropylene and polyvinylidene fluoride. The separator may be a single-layer thin film or may also be a multi-layer composite thin film, and is not particularly limited. When the separator is a multi-layer composite film, the materials in the respective layers may be the same or different, which is not particularly limited.

In some embodiments, the positive electrode piece, the negative electrode piece and the separator can be made into an electrode assembly by means of a winding process or a lamination process.

[Shell]

In some embodiments, the secondary battery comprises the shell of the present disclosure. The inside of the shell comprises the above-mentioned electrode assembly and electrolyte solution; alternatively, the inside of the shell comprises the above-mentioned electrode assembly and solid/semi-solid electrolyte.

In some embodiments, the shell of the secondary battery can be a hard shell, such as a hard plastic shell, an aluminum shell, or a steel shell.

Figure 2:
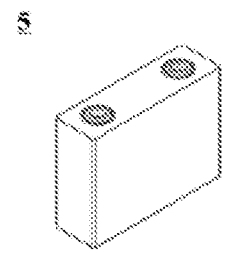
FIG. 2 is a schematic diagram of the secondary battery according to an embodiment of the present application.

The shape of the secondary battery is not particularly limited in the present application, and may be cylindrical, square or of any other shape. For example, FIG. 2 shows a secondary battery 5 with a square structure as an example.

Figure 3:
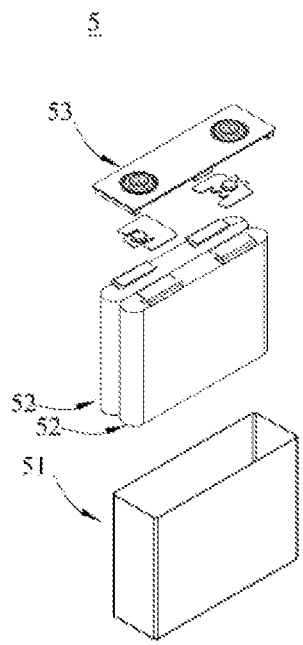
FIG. 3 is an exploded view of the secondary battery according to an embodiment of the present application as shown in FIG. 2.

In some embodiments, referring to FIG. 3, the shell may include a housing 51 and a cover plate 53. Herein, the housing 51 may comprise a bottom plate and side plates connected to the bottom plate, and the bottom plate and the side plates are enclosed to form an accommodating cavity. The housing 51 has an opening in communication with the accommodating cavity, and the cover plate 53 can cover the opening to close the accommodating cavity. The positive electrode piece, the negative electrode piece and the separator can be subjected to a winding process or a laminating process to form an electrode assembly 52. The electrode assembly 52 is encapsulated in the accommodating cavity. The electrolyte solution infiltrates the electrode assembly 52. The number of the electrode assemblies 52 contained in the secondary battery 5 may be one or more, and can be selected by those skilled in the art according to actual requirements.

In some embodiments, the secondary battery can be assembled into a battery module, and the number of the secondary batteries contained in the battery module may be one or more, and the specific number can be selected by those skilled in the art according to the application and capacity of the battery module.

Figure 4:
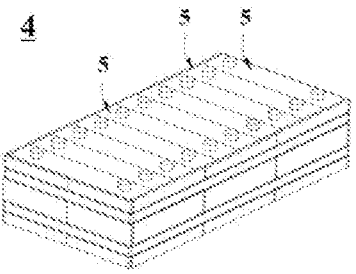
FIG. 4 is a schematic diagram of the battery module according to an embodiment of the present application.

FIG. 4 shows a battery module 4 as an example. Referring to FIG. 4, in the battery module 4, a plurality of secondary batteries 5 may be arranged in sequence in the length direction of the battery module 4. Without doubt, the secondary batteries may also be arranged in any other manner. Furthermore, the plurality of secondary batteries 5 may be fixed by fasteners. Optionally, the battery module 4 may further comprise a shell with an accommodating space, and a plurality of secondary batteries 5 are accommodated in the accommodating space. In some embodiments, the above-mentioned battery module may also be assembled into a battery pack, the number of the battery modules contained in the battery pack may be one or more, and the specific number can be selected by those skilled in the art according to the application and capacity of the battery pack.

Figure 5:
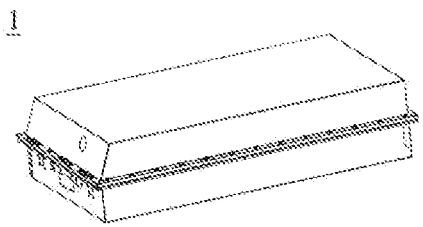
FIG. 5 is a schematic diagram of the battery pack according to an embodiment of the present application.
Figure 6:
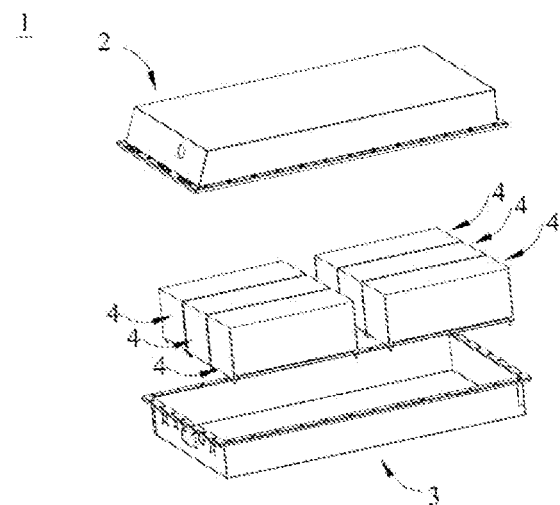
FIG. 6 is an exploded view of the battery pack according to an embodiment of the present application as shown in FIG. 5.

FIGS. 5 and 6 show a battery pack 1 as an example. Referring to FIGS. 5 and 6, the battery pack 1 may comprise a battery box and a plurality of battery modules 4 provided in the battery box. The battery box comprises an upper box body 2 and a lower box body 3, wherein the upper box body 2 can cover the lower box body 3 to form a closed space for accommodating the battery modules 4. A plurality of battery modules 4 may be arranged in the battery box in any manner.

In addition, the present application further provides a power consuming device. The power consuming device comprises at least one of the secondary battery, battery module, or battery pack provided by the present application. The secondary battery, battery module or battery pack can be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like, but is not limited thereto.

As for the power consuming device, the secondary battery, battery module or battery pack can be selected according to the usage requirements thereof.

Figure 7:
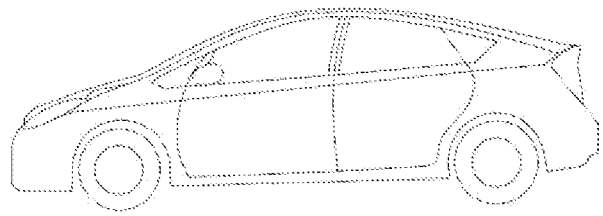
FIG. 7 is a schematic diagram of a power consuming device using the secondary battery according to an embodiment of the present application as a power consuming device.

FIG. 7 shows a power consuming device as an example. The power consuming device may be a pure electric vehicle, a hybrid electric vehicle, a plug-in hybrid electric vehicle or the like. In order to meet the requirements of the power consuming device for a high power and a high energy density of a secondary battery, a battery pack or a battery module may be used.

As another example, the device may be a mobile phone, a tablet computer, a laptop computer, etc. The device is generally required to be thin and light, and the secondary battery may be used as a power supply.

EXAMPLES

Hereinafter, the examples of the present application will be explained. The examples described below are exemplary and are merely for explaining the present application, and should not be construed as limiting the present application. The examples in which no techniques or conditions are specified are based on the techniques or conditions described in documents in the art or according to product instructions. The reagents or instruments used therein for which no manufacturers are specified are all conventional products that are commercially available.

Materials used
UV-curable material A, comprising:
matrix resin: acrylate prepolymer 55 wt. %
diluting monomer: isobornyl acrylate 22 wt. %
diluting monomer: 1,6-hexanediol diacrylate 15 wt. %
photoinitiator: 2-hydroxy-2-methyl-1-phenyl-acetone 4 wt. %
photoinitiator: 2,4,6-trimethylbenzoyl-diphenylphosphine oxide 2 wt. %
leveling agent: Byk360, BYK-Chemie GmbH, Germany 2 wt. %
UV-curable material B, comprising:
matrix resin: epoxy acrylate prepolymer 35 wt. %
diluting monomer: isobornyl acrylate 30 wt. %
diluting monomer: 1,6-hexanediol diacrylate 20 wt. %
photoinitiator: 1-hydroxycyclohexylphenyl ketone 4 wt. %
photoinitiator: 2,4,6-trimethylbenzoyl-diphenylphosphine oxide 2 wt. %
leveling agent: Byk360, BYK-Chemie GmbH, Germany 2 wt. %
pigment dispersant: Corechem Disuper S28 1 wt. %
filler: titanium dioxide 5 wt. %
filler: barium sulfate 1 wt. %
bi-component heat-curable material (mass ratio A:B=4:1), comprising:

| component A: | |
|---|---|
| methyl methacrylate (MMA) | 60 g |
| filler: titanium dioxide | 30 g |
| catalyst: cumyl hydroperoxide | 0.5 g |
| leveling agent: polymethylphenylsiloxane | 0.5 g |
| defoamer: polydimethylsiloxane | 1.0 g |
| component B: | |
| poly(methyl methacrylate) (PMMA) | 5.0 g |
| triethylaniline | 0.5 g |
| n-butyl acetate | 7.5 g |

EXAMPLES

Example 1

A secondary battery with a shell to be repaired was provided, wherein the minimum creepage distance thereof was 10 mm (according to 800 V voltage platform, material group 1), and the thickness of the insulating layer of the shell was 110 μm; and the shell was repaired by the following steps:
  a) positioning of a defect: the external surface of the shell was detected in a contact line scanning mode at an external voltage of 1500 V, scanning was carried out in plane in the x and y directions, respectively, and after scanning, a defect point was found if the leakage current was judged ≥1 mA, wherein the intersection of the coordinates x and y was the defect center point to position the defective area on the external surface of the shell, and the boundary of the defective area was then identified by using a 2D vision camera (the manufacturer Keyence), with the size of the defective area being 0.8 mm×1.2 mm;
  b) removal of an insulating layer: part of the insulating layer in the defective area was cleaned and removed by using a 1000 W pulsed fiber laser to form a groove with a diameter of φ3 mm and a depth of 50 μm;

c) formation of a mushroom stem: the groove was repaired by means of ink-jet printing with UV-curable material A to form a mushroom stem with a diameter of φ3 mm and a depth of 50 μm, and irradiation was then performed for a period of 2 s with an irradiation energy of 1000 mJ/cm² for pre-curing; and d) formation of a mushroom cover: the surface layer was repaired by means of ink-jet printing with UV-curable material A, irradiation was then performed for a period of 2.5 s with an irradiation energy of 1500 mJ/cm² for final curing to form a mushroom cover with a thickness of 100 μm and a diameter of φ10 mm, and the mushroom cover and the mushroom stem were cured together to form a repair part with a mushroom-shaped structure.

The insulation impedance, leakage current, vibration impact test and the binding strength of the above-mentioned repaired secondary battery were tested. The relevant parameters and results were summarized in Table 1.

Examples 2-10

The same steps as in Example 1 were repeated, except that the thickness and diameter of the mushroom cover and the depth and diameter of the mushroom stem were changed, and UV-curable material A was replaced by UV-curable material B.

The insulation impedance, leakage current, vibration impact test and the binding strength of the above-mentioned repaired secondary battery were tested. The relevant parameters and results were summarized in Table 1.

Example 11

The same steps as in Example 1 were repeated, except that c) formation of a mushroom stem: the groove was repaired with a heat-curable material in a precision dispensing mode to form a mushroom stem, and it was then heated at 70° C. for a period of 10 min for pre-curing; and d) formation of a mushroom cover: the surface layer was repaired with a heat-curable material by precision dispensing and then heated at a temperature of 60° C. for a period of 4 h for final curing to form a mushroom cover with a thickness of 100 μm and a diameter of φ10 mm, and the mushroom cover and the mushroom stem were cured together to form a repair part with a mushroom-shaped structure.

The insulation impedance, leakage current, vibration impact test and the binding strength of the above-mentioned repaired secondary battery were tested. The results were summarized in Table 1.

Examples 12-14

The same steps as in Example 11 were repeated, except that the thickness and diameter of the mushroom cover were changed. The insulation impedance, leakage current, vibration impact test and the binding strength of the above-mentioned repaired secondary battery were tested. The results were summarized in Table 1.

Comparative Example 1

The same steps as in Example 1 were repeated, except that the depth of the groove was 100 μm (>½ the thickness of the original coating) and the original coating was almost removed. The insulation impedance, leakage current, vibration impact test and the binding strength of the above-mentioned repaired secondary battery were tested. The results were summarized in Table 1.

Comparative Example 2 a) positioning of a defect: the same as in step a of Example 1;

b) repair of defect: a pressure-sensitive adhesive tape with a size of 10 mm×10 mm and a total thickness of 110 μm was taken (wherein the total thickness of the pressure-sensitive adhesive was 60 μm, and the total thickness of PET film was 50 μm) and pasted on the defective area of the original coating to confirm that the defect position was centered; and c) pressing the adhesive tape tightly: an auxiliary pressing module with a weight of 5 kg and a contact area of 50 mm×50 mm with the adhesive tape was used to press directly above the adhesive tape, and the pressure was maintained for 1 min;

The insulation impedance, leakage current, vibration impact test and the bonding strength of the above-mentioned repaired secondary battery were tested, and the relevant parameters and results were summarized in Table 1.

Related Test Method

Test of withstand voltage and leakage current of secondary battery

A battery was placed in a test tool, and the inner wall of the tool was made of a conductive foam material. The soft conductive foam could bring the tool in full contact with the five surfaces (except the top surface, including the corner edges) of the cell. An insulation and voltage withstanding tester (supplier: Hioki) was used, wherein a positive probe was brought into contact with a bare aluminum position of the top cover of the cell while a negative probe was connected to the conductive foam in the tool.

The test voltage in the insulation and voltage withstanding tester was adjusted to 2700 VDC (DC was direct current), wherein the voltage rise time was 1 s, and the holding time was 60 s. After starting the test, the leakage current value displayed by the instrument was observed and recorded. If the leakage current value was ≤0.1 mA, it was qualified, and if it exceeded this current value or the instrument gave an alarm before the voltage rose to 2700 VDC, it was judged as unqualified.

Insulation Impedance Test of Secondary Battery

A battery was placed in a test tool, and the inner wall of the tool was made of a conductive foam material. The soft conductive foam could bring the tool in full contact with the five surfaces (except the top surface, including the corner edges) of the cell. An insulation and voltage withstanding tester (supplier: Hioki) was used, wherein a positive probe was brought into contact with a bare aluminum position of the top cover of the cell while a negative probe was connected to the conductive foam in the tool.

The test voltage in the insulation and voltage withstanding tester was adjusted to 1000 VDC (DC was direct current), wherein the test time was 5 s. After starting the test, the resistance value displayed by the instrument was observed and recorded. If the resistance value was ≥10 GΩ, it was qualified; and if it was lower than 10 GΩ, it was judged as unqualified.

Vibration impact test (whether displacement and wrinkling occur)

a) The vibration impact test was carried out by using a battery module or battery pack system. In this example, a 1P108S (1 in parallel and 108 in series) battery pack system was used. Before the test, the SOC of the system (SOC was the ratio of the remaining capacity to the normal capacity, and the value thereof was between 0 and 1) was adjusted to not less than 50% of the normal SOC range.

The vibration test was carried out by reference to the test method in section 8.2.1 of GB38031-2020 "Electric Vehicles Traction Battery Safety Requirements", and with reference to Table 2, three vibration tests in the x, y and z directions were carried out (x was the driving direction of a vehicle, y was the horizontal direction perpendicular to the driving direction, and z was the vertical direction perpendicular to the driving direction). After the vibration test was completed, the battery pack system was observed for 2 h and then disassembled, and whether the external insulating layer (including the repaired insulating layer) of the cell was in good condition and whether there were wrinkles, displacement and other phenomena were observed with naked eyes, and if any, the test was judged as unqualified.

b) The impact test was carried out using a battery pack system with the same model as in the vibration test, and the test was carried out by reference to section 8.2.2 of GB38031-2020 "Electric Vehicles Traction Battery Safety Requirements", wherein a half sine wave as specified in Table 4 was applied to the test object, 6 times in each of the ±z directions, totally 12 times. After the impact test was completed, the battery pack system was observed for 2 h and then disassembled, and whether the external insulating layer (including the repaired insulating layer) of the cell was in good condition and whether there were wrinkles, displacement and other phenomena were observed with naked eyes, and if any, the test was judged as unqualified.

Binding strength test (only the strength in the shear direction was tested)

By reference to GB/T 7124-2008 "Adhesives—Determination of tensile lap-shear strength"

1) Shear strength test: A specimen was properly clamped on a 10000 N tensile tester (a gasket equivalent to the thickness of the test piece was placed at each test clamp, the force applied to the test piece was parallel to the bonding plane, and it was noted that the upper and lower clamps were controlled to avoid obvious twisting), the test speed of the tensile tester was then set to 5 mm/min, and the three items "tension", "displacement" and "maximum tension" were all reset. The tensile tester was started, the specimen was observed until pulled off, the "maximum tension" value and the "displacement" value at this time were recorded, and the situation in the pull-off position was recorded (interface failure AF or cohesive failure CF of the adhesive body).

2) High-temperature high-humidity storage: A shell sample of each of the examples and comparative examples was taken and placed in a constant temperature and humidity cabinet at 85° C. and 85% relative humidity for a certain period of time. When the storage time reached 1000 h, the shell sample was taken out, left to stand at room temperature for 2 h, and then tested for the shear strength at 1000 h according to the method of step 1. If the shear strength at 1000 h was ≥2.0 MPa and the failure mode was not the case where the repair part fell off or was torn, it was judged as qualified, that is, the sample passed the 1000 h boding shear strength test; otherwise, it was unqualified.

TABLE 1

Relevant parameters and test results of examples and comparative examples

| Example No. | Repair material | Mushroom stem Depth/μm | Mushroom cover Diameter/mm | Mushroom cover Thickness/μm | Insulation impedance/GΩ | Leakage current/mA | Any displacement and wrinkling during vibration impact? | Passed the 1000 h bonding shear strength test? |
|---|---|---|---|---|---|---|---|---|
| 1 | UV-A | 50 | 15 | 100 | >10 | <0.1 | No | Yes |
| 2 | UV-A | 30 | 3 | 40 | 0.26 | >1 | No | Yes |
| 3 | UV-A | 30 | 3 | 150 | 0.29 | >1 | No | Yes |
| 4 | UV-A | 30 | 27 | 40 | 1.10 | 0.55 | No | Yes |
| 5 | UV-A | 30 | 27 | 150 | >10 | <0.1 | No | Yes |
| 6 | UV-A | 70 | 3 | 40 | 0.33 | >1 | No | Yes |
| 7 | UV-A | 70 | 3 | 150 | 0.20 | >1 | No | Yes |
| 8 | UV-A | 70 | 27 | 40 | 0.90 | 0.26 | No | Yes |
| 9 | UV-A | 70 | 27 | 150 | >10 | <0.1 | No | No |
| 10 | UV-B | 50 | 15 | 100 | >10 | <0.1 | No | Yes |
| 11 | Heat-curable | 50 | 3 | 40 | 0.18 | >1 | No | Yes |
| 12 | Heat-curable | 50 | 3 | 150 | 0.51 | >1 | No | Yes |
| 13 | Heat-curable | 50 | 27 | 40 | 1.7 | 0.26 | No | Yes |
| 14 | Heat-curable | 50 | 27 | 150 | >10 | <0.1 | No | Yes |
| Comparative Example 1 | UV-A | 100 | 15 | 100 | 2.2 | <0.1 | No | No |
| Comparative Example 2 | Pressure-sensitive adhesive tape | Repair with a pressure-sensitive adhesive tape with a total thickness of 110 μm | | | >10 | <0.1 | Yes | No |

According to the above results, it could be seen that Examples 1, 5, 10, and 14, which met the relevant parameters of the present disclosure, had all achieved good results in terms of insulation, withstand voltage, vibration impact, and binding strength.

However, in contrast, the insulation resistance and binding strength of Comparative Example 1 were both inferior to those of the examples of the present disclosure after the thickness of the entire insulating layer was removed. In Comparative Example 2, the pressure-sensitive adhesive tape was used to repair the insulating layer defect. Although the insulation and withstand voltage performance thereof met the requirements of the related art, wrinkling and displacement easily occurred during vibration impact, and the binding strength requirement could not be met.

It should be noted that the present application is not limited to the above embodiments. The above embodiments are exemplary only, and any embodiment that has substantially the same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

What is claimed is:

1. A battery shell for a battery, comprising:
   an insulating layer provided at an outer surface of the battery shell, the insulating layer comprising a repair part;
   wherein:
      the repair part is formed of a curable material and has a shape of a mushroom, the repair part comprising an upper part having a shape of a cover of the mushroom and a lower part having a shape of a stem of the mushroom, the lower part being wholly embedded in the insulating layer, the upper part protruding from the insulating layer, and a lower surface of the upper part covering at least a portion of an upper surface of the insulating layer;
      the lower part embedded in the insulating layer does not extend to the outer surface of the battery shell; and
      in a cross section of the repair part perpendicular to a surface of the insulating layer, a longest dimension of the upper part is greater than or equal to a sum of a width of the lower part and a creepage distance of the battery.

2. The battery shell according to claim 1, wherein in the cross section of the repair part perpendicular to the surface of the insulating layer, a largest thickness of the upper part is greater than or equal to ½ of a thickness of the insulating layer.

3. The battery shell according to claim 1, wherein a depth at which the lower part is embedded in the insulating layer is less than or equal to ½ of a thickness of the insulating layer.

4. The battery shell according to claim 1, wherein:
   a wetting angle $\theta$ of the curable material on a surface of the insulating layer satisfies $1<\theta<90$; and
   in the cross section of the repair part perpendicular to the surface of the insulating layer, the width of the lower part is greater than or equal to $10t \times \cot \theta + 3$ where $t$ is a thickness of the insulating layer, in millimeters.

5. The battery shell according to claim 1, wherein the curable material comprises a photocurable material.

6. The battery shell according to claim 5, wherein a viscosity of the photocurable material is in a range of 30-500 mPa·s.

7. The battery shell according to claim 5, wherein the photocurable material is an ultraviolet photocurable material, and the ultraviolet photocurable material comprises following contents in weight percentage based on a total weight of the photocurable material:
   30-60 wt. % of a matrix resin,
   30-50 wt. % of a diluting monomer,
   3-15 wt. % of a photoinitiator, and
   0-20 wt. % of additional auxiliaries.

8. The battery shell according to claim 7, wherein:
   the diluting monomer is selected from 1,6-hexanediol diacrylate, isobornyl acrylate, or isobornyl methacrylate; and
   the photoinitiator comprises at least one selected from 2-hydroxy-2-methyl-1-phenyl-acetone, 1-hydroxycyclohexylphenyl ketone, phenylbis(2,4,6-trimethylbenzoyl)phosphine oxide, and 2,4,6-trimethylbenzoyl-diphenylphosphine oxide.

9. The battery shell according to claim 8, wherein:
   the diluting monomer is selected from 1,6-hexanediol diacrylate and isobornyl acrylate.

10. The battery shell according to claim 1, wherein the curable material comprises a heat-curable material.

11. The battery shell according to claim 10, wherein the heat-curable material comprises following contents in weight percentage based on a total weight of the heat-curable material:
    45-70 wt. % of a matrix resin,
    0.1-5 wt. % of a catalyst, and
    29.9-50 wt. % of auxiliaries.

12. The battery shell according to claim 10, wherein a viscosity of the heat-curable material is in a range of 30-500 mPa·s.

13. The battery shell according to claim 1, wherein the repair part wholly is formed of a curable material.

14. A method for forming the battery shell of claim 1, comprising:
    positioning a defective area at the outer surface of the battery shell of the battery and identifying a boundary of the defective area;
    removing a part of the insulating layer of the battery shell in the defective area to form a groove covering the entire defective area;
    repairing the groove with a curable material to form the lower part of the repair part, and performing pre-curing; and
    repairing a surface layer with the curable material and performing final curing to form the upper part of the repair part, the upper part and the lower part being cured together to form the repair part having the shape of the mushroom;
    wherein:
       the upper has the shape of the cover of the mushroom and the lower part has the shape of the stem of the mushroom stem, the lower part is embedded in the insulating layer, the upper part protrudes from the insulating layer, and the lower surface of the upper part covers the at least a portion of the upper surface of the insulating layer; and
       in the cross section of the repair part perpendicular to the surface of the insulating layer, the longest dimension of the upper part is greater than or equal to the sum of the width of the lower part and the creepage distance of the battery.

15. The method according to claim 14, wherein a projected area of the groove in a horizontal direction is greater than a projected area of the defective area in the horizontal direction.

16. The method according to claim 14, wherein a repaired thickness of the curable material is in a range from a depth of the lower part to a sum of the depth of the lower part and 10% of a thickness of the insulating layer.

17. A secondary battery, comprising:
   a battery shell comprising an insulating layer provided at an outer surface of the battery shell, the insulating layer comprising a repair part, wherein:
      the repair part is formed of a curable material and has a shape of a mushroom, the repair part comprising an upper part having a shape of a cover of the mushroom and a lower part having a shape of a stem of the mushroom, the lower part being embedded in the insulating layer, the upper part protruding from the insulating layer, and a lower surface of the upper part covering at least a portion of an upper surface of the insulating layer;
      the lower part embedded in the insulating layer does not extend to the outer surface of the battery shell; and
      in a cross section of the repair part perpendicular to a surface of the insulating layer, a longest dimension of the upper part is greater than or equal to a sum of a width of the lower part and a creepage distance of the secondary battery;
   an electrode assembly arranged inside the battery shell; and
   an electrolyte solution or a solid/semi-solid electrolyte arranged inside the battery shell.

18. A battery module, comprising the secondary battery according to claim 17.

19. A battery pack, comprising the battery module according to claim 18.

20. A power consuming device, comprising the secondary battery according to claim 17.

* * * * *